United States Patent [19]

Morimoto

[11] Patent Number: 4,942,783
[45] Date of Patent: Jul. 24, 1990

[54] TRANSMISSION RATION CONTROL SYSTEM FOR A CONTINUOUSLY VARIABLE TRANSMISSION

[75] Inventor: Yoshihiko Morimoto, Mitaka, Japan

[73] Assignee: Fuji Jukogyo Kabushiki Kaisha, Tokyo, Japan

[21] Appl. No.: 339,864

[22] Filed: Apr. 14, 1989

Related U.S. Application Data

[63] Continuation-in-part of Ser. No. 88,060, Aug. 21, 1987, abandoned.

[30] Foreign Application Priority Data

Aug. 23, 1986 [JP] Japan .................................. 61-197494

[51] Int. Cl.$^5$ .............................................. B60K 41/14
[52] U.S. Cl. ........................................ 74/866; 74/867; 364/424.1
[58] Field of Search ................ 364/424.1; 74/864, 866, 74/867, 868, 869; 474/18, 28

[56] References Cited

U.S. PATENT DOCUMENTS

| | | | |
|---|---|---|---|
| 4,253,347 | 3/1981 | Mizuno et al. ..................... | 74/866 X |
| 4,505,169 | 3/1985 | Ganoung ........................... | 74/874 X |
| 4,515,040 | 5/1985 | Takeuchi et al. .................. | 74/866 |
| 4,628,773 | 12/1986 | Itoh et al. ......................... | 74/867 |
| 4,674,363 | 6/1987 | Miyawaki ......................... | 474/18 X |
| 4,680,991 | 7/1987 | Miyawaki ......................... | 474/28 X |
| 4,702,128 | 10/1987 | Oshiage ............................ | 74/867 X |
| 4,708,031 | 11/1987 | Morimoto et al. ................ | 74/866 |

FOREIGN PATENT DOCUMENTS 0027672 4/1981 European Pat. Off. .
0207603 1/1987 European Pat. Off. .

Primary Examiner—Leslie A. Braun
Assistant Examiner—Harold F. Macris
Attorney, Agent, or Firm—Martin A. Farber

[57] ABSTRACT

A control system for a continuously variable transmission for a motor vehicle has a line pressure control valve and a transmission ratio control valve, each having a spool for controlling oil supplied to a cylinder of a pulley. The transmission ratio control valve has chambers at both ends of the spool. The flow rate of oil supplied to the chambers is controlled by an on-off valve at duty ratio in accordance with a desired transmission ratio so that the spool is shifted, so that the transmission ratio changing speed is controlled. The duty ratio is corrected by line pressure, so that the transmission ratio is controlled in accordance with the line pressure.

8 Claims, 6 Drawing Sheets

TRANSMISSION RATION CONTROL SYSTEM FOR A CONTINUOUSLY VARIABLE TRANSMISSION

RELATED APPLICATION

This is a continuation-in-part application of my co-pending patent application Ser. No. 07/088,060 filed Aug. 21 1987 and now abandoned.

BACKGROUND OF THE INVENTION

The present invention relates to a control system for a continuously variable belt-drive automatic transmission for a motor vehicle, and more particularly to a system for controlling the transmission ratio at a minimum transmission ratio.

A known control system for a continuously variable belt-drive transmission comprises an endless belt running over a drive pulley and a driven pulley. Each pulley comprises a movable conical disc which is axially moved by a fluid operated servo device so as to vary the running diameter of the belt on the pulleys in dependency on driving conditions. The system is provided with a hydraulic circuit including a pump for supplying oil to the servo devices, a line pressure control valve and a transmission ratio control valve. Each valve comprises a spool to control the oil supplied to the servo devices.

The transmission ratio control valve operates to determine the transmission ratio in accordance with the opening degree of a throttle valve of an engine and the speed of the engine. The line pressure control valve is adapted to control the line pressure in accordance with the transmission ratio and the engine speed. The line pressure is controlled to prevent the belt from slipping on pulleys in order to transmit the output of the engine.

At the start of the vehicle, the transmission ratio is set at a maximum value. When the vehicle speed and engine speed reach set values under a driving condition, the transmission ratio starts to change (to upshift). The transmission ratio is automatically and continuously reduced at a speed which is decided by pressure of oil supplied to the servo device of the drive pulley, and actual transmission ratio. In such a system, the speed of changing of the transmission ratio up to a desired transmission ratio can not be controlled in accordance with driving conditions. Accordingly, hunting or overshooting of the transmisson ratio occurs, which causes the driveability of the vehicle to reduce.

EP-A-No. 207603 discloses a system wherein desired transmission ratio is decided by a throttle valve opening degree and an engine speed to control the transmission ratio changing speed. Further, in an oil pressure control system, the line pressure is directly applied to a cylinder of the driven pulley and controlled line pressure is supplied to a cylinder of the drive pulley. In the system, the flow rate to the drive pulley cylinder is calculated, assuming that transmitting torque in the transmission is constant.

However, during the operation in accordance with the desired transmission ratio, the transmitting torque always varies. Thus, the line pressure is controlled in response to the variation of the transmitting torque. Since the line pressure is supplied to the drive pulley cylinder in order to control the transmission ratio, the variation of the line pressure affects necessarily the transmission ratio changing speed. As a result, actual transmission ratio does not coincide with desired transmission ratio.

SUMMARY OF THE INVENTION

The object of the present invention is to provide a system which may correct the transmission ratio changing speed in accordance with the variation of the line pressure so as to approach the desired transmission ratio changing speed.

According to the present invention, there is provided a control system for a continuously variable transmission for transmitting the power of an internal combustion engine, the system comprising a drive pulley having a hydraulically shiftable disc and a hydraulic cylinder for operating the disc, a driven pulley having a hydraulically shiftable disc and a hydraulic cylinder for operating the disc, a belt engaged with both pulleys, a first hydraulic circuit having a pump for supplying oil to both the hydraulic cylinders, a line pressure control valve provided in the first hydraulic circuit, and having a spool, a transmission ratio control valve provided in the first hydraulic circuit and having a spool for controlling the oil supplied to the cylinder of the drive pulley to change the transmission ratio to a desired transmission ratio.

The system comprises first means for shifting the spool of each control valve, sensing means for sensing operating conditions of the engine and the transmission and for producing a first signal dependent on the conditions, second means responsive to the first signal for producing an actual transmission ratio signal, third means responsive to the first signal for producing a desired line pressure signal and a desired transmission ratio signal, fourth means responsive to the desired transmission ratio signal and the actual transmission ratio signal for producing a control signal for operating the first means to shift the spool of the transmission ratio control valve to provide a transmission ratio, fifth means responsive to the desired line pressure signal for producing a control signal for operating the first means to shift the spool of the line pressure control value to provide a line pressure, sixth means for producing a correcting signal dependent on the line pressure, seventh means responsive to the correcting signal for correcting the control signal for the transmission ratio control valve so as to control the transmission ratio in accordance with the line pressure.

In an aspect of the invention the transmission ratio control valve has chambers at both ends of the spool, the first means includes a second hydraulic circuit for supplying oil to the chambers, and control valve means provided with the second hydraulic circuit for controlling flow rate of control oil supplied to the chambers of transmission ratio control valve.

The other objects and features of this invention will become understood from the following description with reference to the accompanying drawings.

DETAILED DESCRIPTION OF THE PREFERRED EMBODIMENTS

Figure 1:
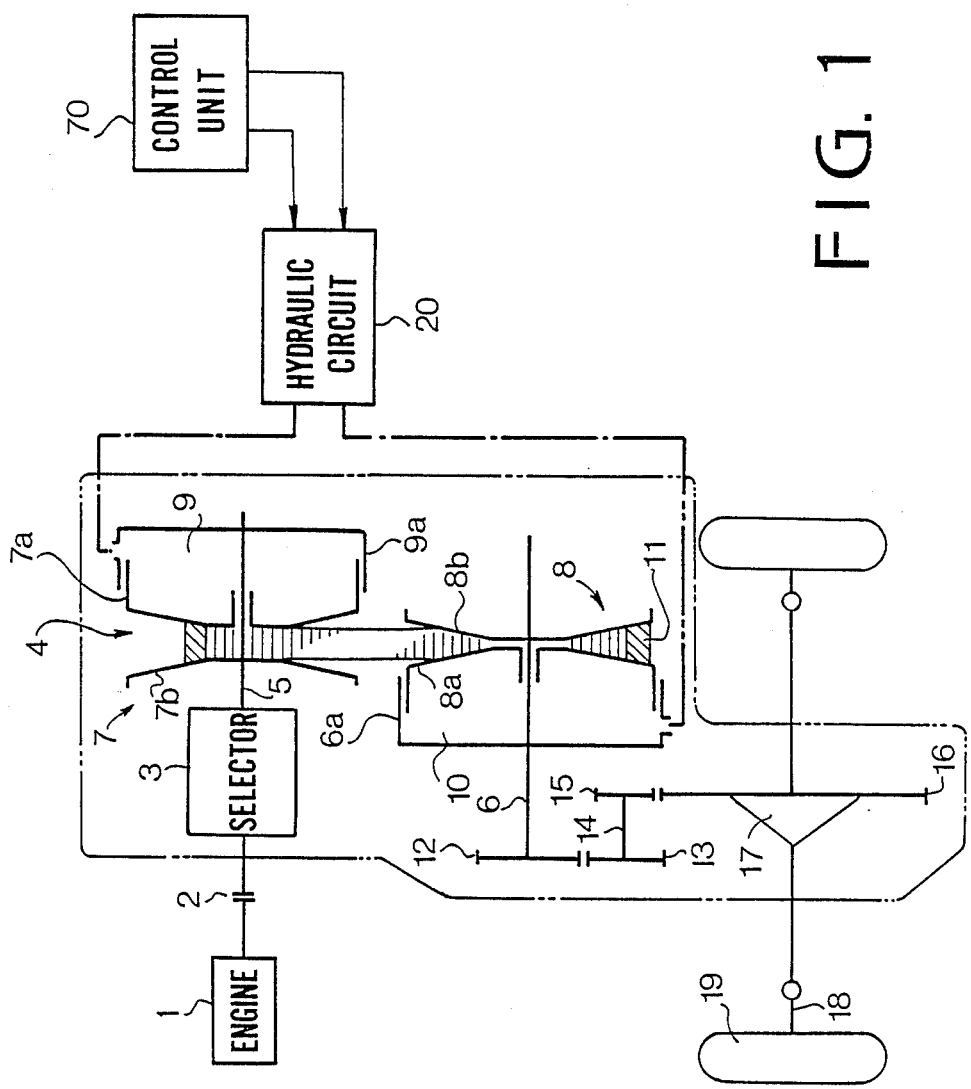
FIG. 1 is a schematic illustration of a continuously variable belt-drive transmission.

Referring to FIG. 1, a motor vehicle is provided with an engine 1, an electromagnetic powder clutch 2 for transmitting the power of the engine to a continuously variable belt-drive transmission 4 through a selector mechanism 3.

The belt-drive transmission 4 has a main shaft 5 and an output shaft 6 provided in parallel with the main shaft 5. A drive pulley (primary pulley) 7 and a driven pulley (secondary pulley) 8 are mounted on shafts 5 and 6 respectively. A fixed conical disc 7b of the drive pulley 7 is integral with main shaft 5 and an axially movable conical disc 7a is axially slidably mounted on the main shaft 5. The movable conical disc 7a also slides in a cylinder 9a formed on the main shaft to provide a servo device. A chamber 9 of the servo device communicates with a hydraulic circuit 20.

A fixed conical disc 8b of the driven pulley 8 is formed on the output shaft 6 opposite a movable conical disc 8a. The conical disc 8a has a cylindrical portion which is slidably engaged in a cylinder 6a of the output shaft 6 to form a servo device. A chamber 10 of the servo device is also communicated with control circuit 20. A drive belt 11 engages with the drive pulley 7 and the driven pulley 8.

Secured to the output shaft 6 is a drive gear 12 which engages with an intermediate reduction gear 13 on an intermediate shaft 14. An intermediate gear 15 on the shaft 14 engages with a final gear 16. The rotation of the final gear 16 is transmitted to axles 18 of vehicle driving wheels 19 through a differential 17.

Figure 2A:
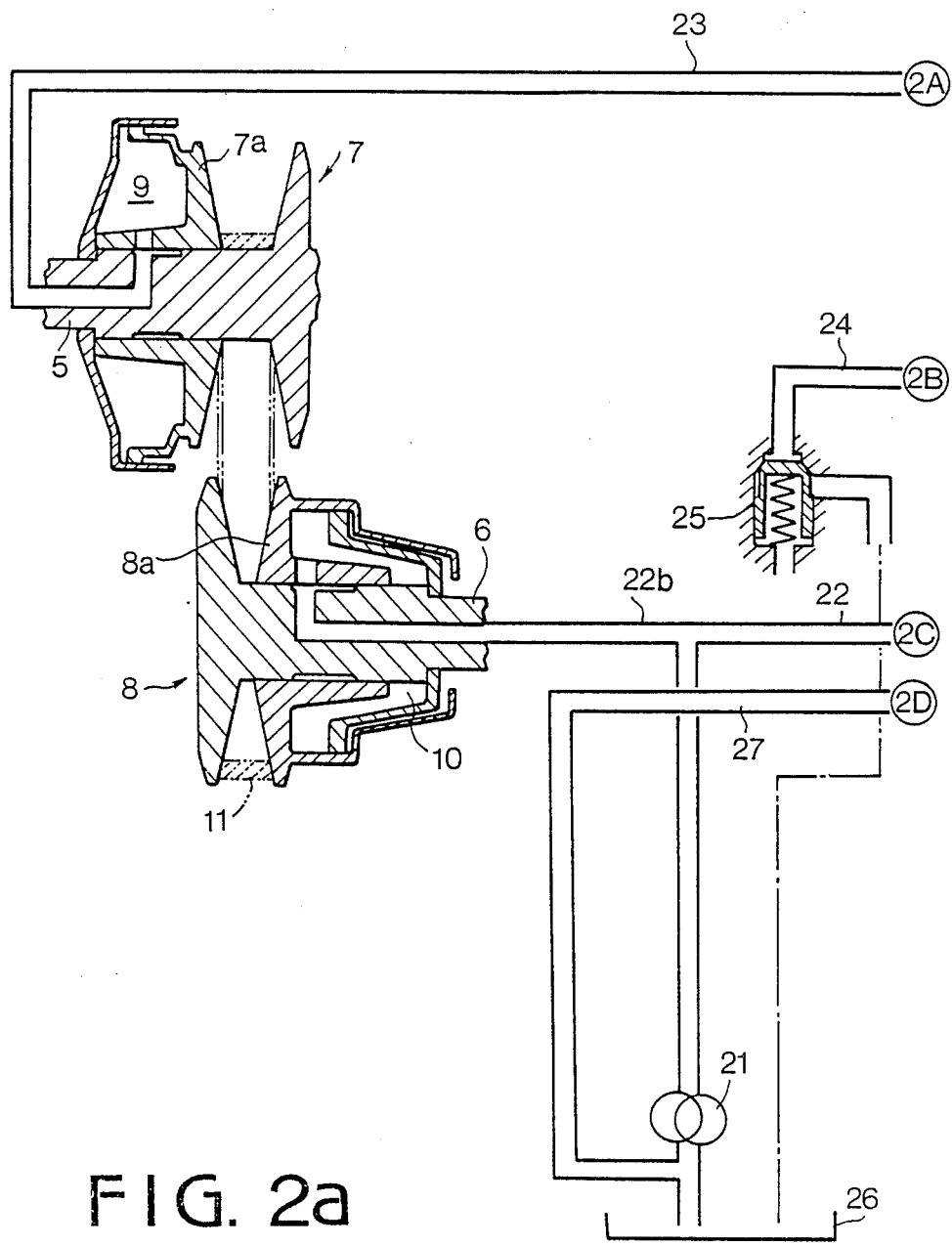
FIGS. 2a and 2b show a hydraulic circuit for the transmission.
Figure 2B:
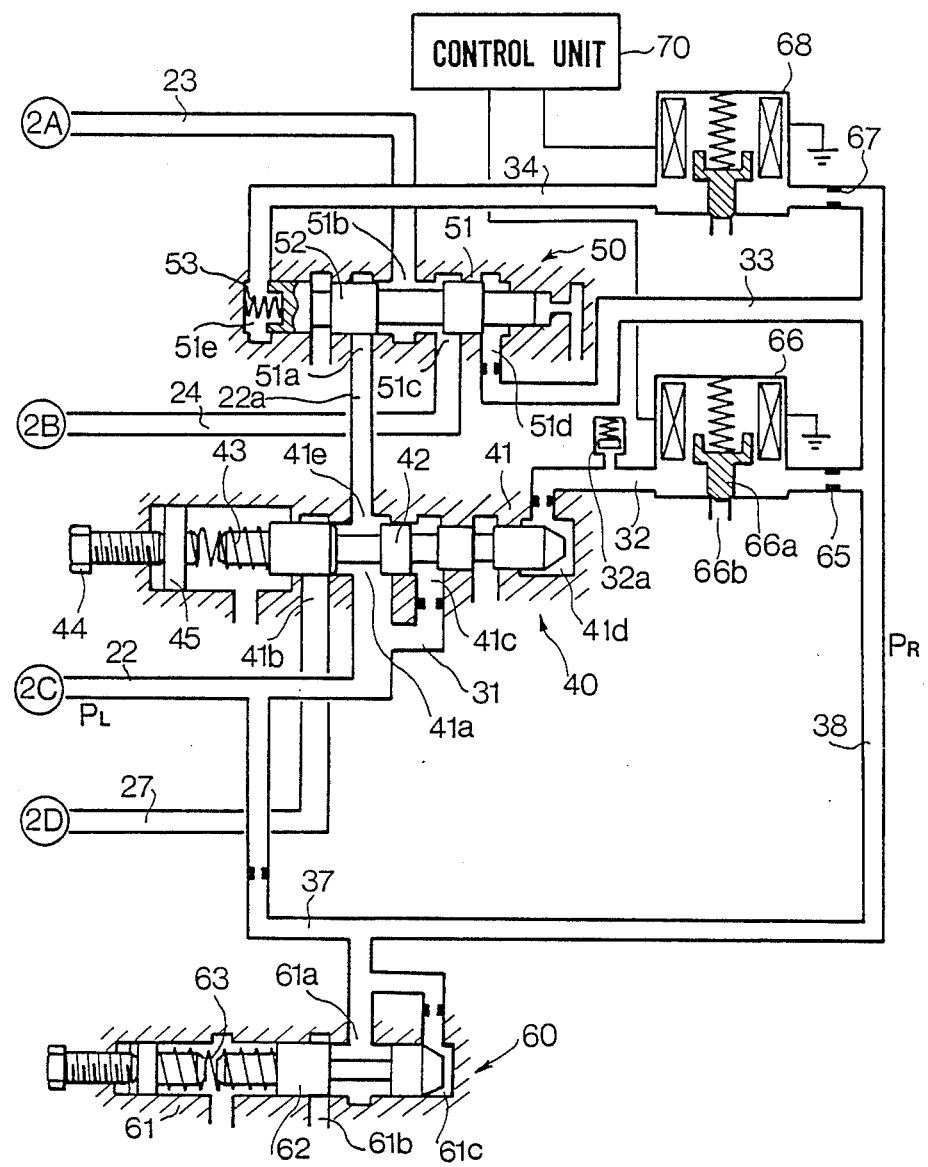

Referring to FIGS. 2a and 2b, chamber 9 of the drive pulley 7 is supplied with pressurized oil by an oil pump 21 from an oil reservoir 26 passing through a line pressure conduit 22, ports 41a and 41e of a line pressure control valve 40, transmission ratio control valve 50, and conduit 23. The chamber 10 of driven pulley 8 is applied with pressurized oil through a passage 22b without passing through valves 40 and 50. The movable conical disc 7a of the drive pulley 7 is so designed that the pressure receiving area thereof is larger than that of movable conical disc 8a of the driven pulley 8.

The line pressure control valve 40 comprises a valve body 41, spool 42, and chambers 41c and 41d. The spool 42 is applied with pressure of the pressurized oil in the chamber 41c supplied through a conduit 31. The other end of the spool 42 is applied with the force of a spring 43 provided between the end of the spool 42 and a retainer 45 the position of which is adjustable by a screw 44. The port 41a is communicated with a drain port 41b for a drain passage 27 in accordance with the position of a land of the spool 42. The drain port 41b communicates with oil reservoir 26 through passage 27.

The transmission ratio control valve 50 comprises a valve body 51, spool 52, spring 53 for urging the spool 52 in the downshift direction. A port 51b of the valve body 51 is selectively communicated with a pressure oil supply port 51a or a drain port 51c in accordance with the position of lands of spool 52. Port 51b communicates with chamber 9 through conduit 23, and port 51a communicates with port 41e of line pressure control valve 40 through conduit 22a. The drain port 51c is communicated with the oil reservoir 26 through a conduit 24 and a check valve 25.

The system is provided with a regulator valve 60, and solenoid operated on-off valves 66 and 68.

The regulator valve 60 comprises a valve body 61, an inlet port 61a connected to the pump 21 through passages 37 and 22, a spool 62, an end chamber 61c connected to the passage 37, and a spring 63 urging the spool 62 to the chamber 61c. When the pressure of oil in the chamber 61c becomes higher than a set value, the spool 62 is shifted to the left, so that an inlet port 61a communicates with a drain port 61b to drain the oil. Thus, a constant pressure of oil is provided in the passage 37.

The passage 37 is communicated with the chamber 41d of line pressure control valve 40 through a constant pressure passage 38, orifice 65, solenoid operated on-off valve 66, and passage 32 having an accumulator 32a. Further, the passage 38 is communicated with an end chamber 51d of the transmission ratio control valve 50 through a passage 33, and with another end chamber 51e through an orifice 67, solenoid operated on-off valve 68 and passage 34. The solenoid operated on-off valve 66 is adapted to be operated by pulses. When energized, a valve 66a opens a drain port 66b. The pulsation of the pressure of oil in the passage 32 is smoothed by accumulator 32a. The solenoid operated on-off valve 68 is the same as valve 66 in construction and operation. The valves 66 and 68 are operated by signals from a control unit 70. Thus, pressure controlled by the valves 66 and 68 is applied to chambers 41d and 51e.

In the transmission ratio control valve 50, pressure receiving area of the spool 52 at chamber 51e is set to a value larger than the area at the chamber 51d. On the other hand, the control pressure in the chamber 51e can be changed between a maximum value, which is the same as the constant pressure in the chamber 51d is 0% and zero by controlling the duty ratio of pulses for operating the valve 68. The transmission ratio control valve 50 is so arranged that the spool 52 is at a neutral position at a middle duty ratio (for example 50%) and is located in an oil supply position by increasing the duty ratio from the middle duty ratio because of reduction of control pressure in the chamber 51e Further, the speed of the movement of the spool 52 changes with the magnitude of changing of the duty ratio. The spool 52 is shifted to an oil drain position by decreasing the duty ratio. It will be understood that when the oil is supplied to the chamber 9, the transmission is upshifted.

Figure 3:
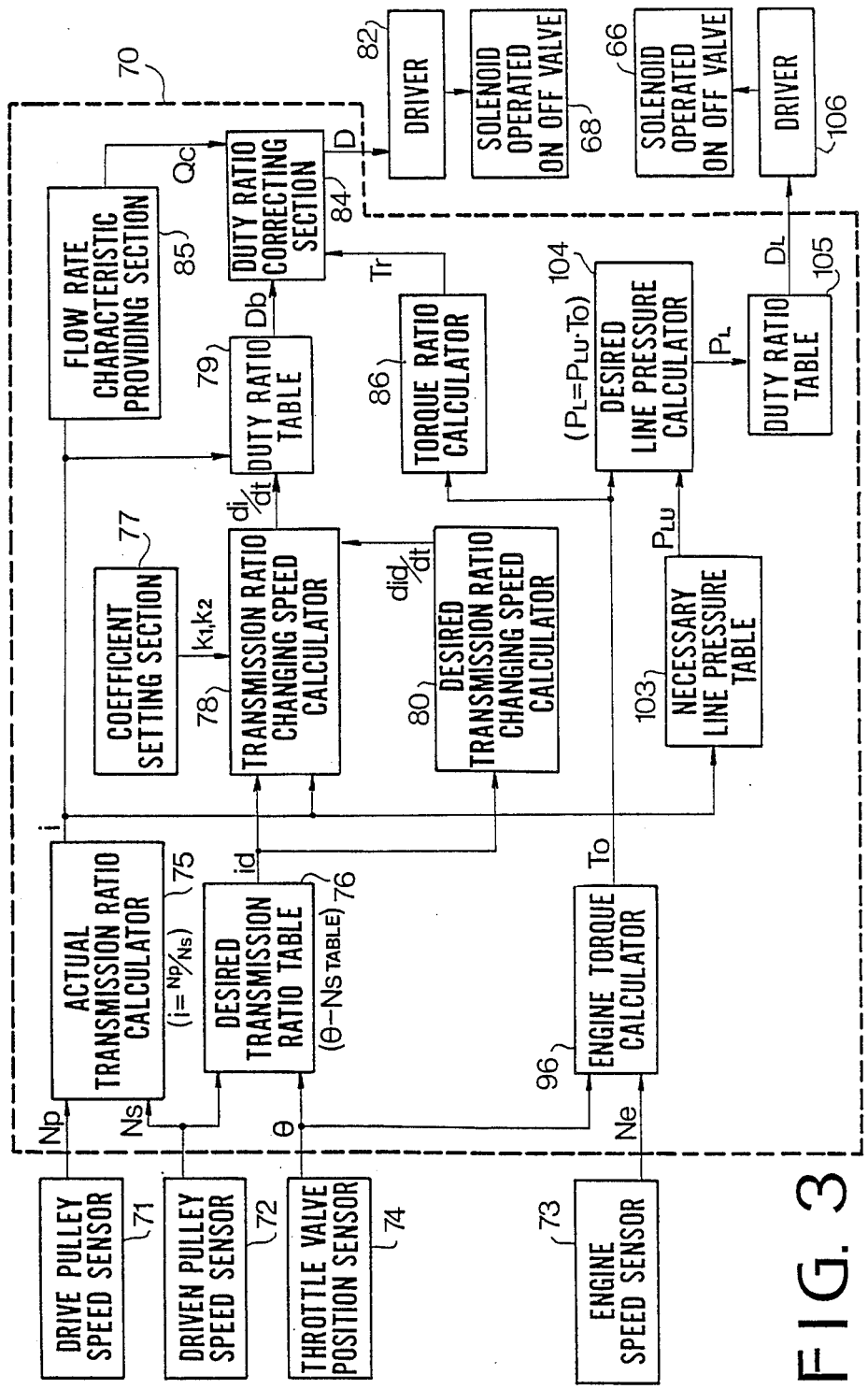
FIGS. 3a shows a schematic diagram of a control system according to the present invention.

Referring to FIG. 3, a drive pulley speed sensor 71, driven pulley speed sensor 72, engine speed sensor 73 and throttle position sensor (or intake manifold pressure sensor) 74 are provided. Output signals $N_P$ and $N_S$ of sensors 71, 72 are fed to an actual transmission ratio calculator 75 to produce an actual transmission ratio i in accordance with $i = N_P/N_S$. Output signal $N_S$ and output signal representing the opening degree of the throttle position sensor 74 are fed to a desired transmission ratio table 76. The desired transmission ratio id is derived from the table 76 in accordance with signals $N_S$ and $\theta$.

The desired transmission ratio id is fed to a desired transmission ratio changing speed calculator 80 which produces a desired transmission ratio changing speed did/dt. A coefficient setting section 77 produces coefficients K1 and K2. The actual transmission ratio i, desired transmission ratio id, desired transmission ratio changing speed (rate) did/dt and coefficients K1 and K2 are applied to a transmission ratio 10 changing speed calculator 78 to produce a transmission ratio changing speed (rate) di/dt from a formula $di/dt = K1(id - i) + K2 - did/dt$.

The speed (rate) di/dt and actual ratio i are applied to a duty ratio table 79 to derive the duty ratio Db. The duty ratio Db is supplied to the solenoid operated on-off valve 68 through a duty ratio correcting section 84 and driver 82.

Further, the output signal θ of throttle position sensor 74 and the output $N_e$ of engine speed sensor 73 are fed to an engine torque calculator 96, so that engine torque $T_0$ is calculated based on throttle position 8 and engine speed $N_e$.

On the other hand, the actual transmission ratio i from the calculator 75 is applied to a necessary line pressure table 103 to derive a necessary line pressure $P_{LU}$ per unit torque. The necessary line pressure $P_{LU}$ and the engine torque $T_0$ are applied to a desired line pressure calculator 104 where a desired line pressure $P_L$ is calculated by equation $P_L = P_{LU} \times T_0$.

The desired line pressure $P_L$ is applied to a duty ratio table 105 to derive a duty ratio $D_L$ corresponding to the desired line pressure $P_L$. The duty ratio $D_L$ is supplied to a driver 106 which operates the solenoid operated on-off valve 66 at the duty ratio.

The correcting of the duty ratio Db in accordance with the change of the line pressure will be described hereinafter. Since the line pressure is determined by the engine torque, the duty ratio Db for the transmission ratio is corrected by the engine torque in the first embodiment of the invention.

Explaining the principle of the control, supply flow rate Qs to the chamber 9 and drain flow rate Qd from chamber 9 are represented as follows $$Qs = C \cdot S_S \sqrt{(P_L - P_p)2g/\gamma}$$
$$= a\sqrt{P_L - P_p}$$
$$= a\sqrt{P_L - f(i) \cdot P_L}$$
$$= a\sqrt{P_L(1 - f(i))}$$

$$a = C \cdot S_S \sqrt{2g/\gamma}$$

$$Qd = C \cdot Sd \sqrt{2g \, P_p/\gamma}$$
$$= b\sqrt{P_p}$$
$$= b\sqrt{P_L \cdot f(i)}$$

$$b = C \cdot Sd \sqrt{2g/\gamma}$$

where
  $p_p$ is the pressure in chamber 9,
  $p_L$ is the lone pressure,
  C is the coefficient for flow rate,
  g is the acceleration of gravity,
  γ is the specific gravity of oil,
  $S_s$ is the opening area of supply port 51a,
  $S_d$ is the opening area of drain port 51c.

Since line pressure $P_L$ is proportional to the transmitting torque $T_O$, if a basic line pressure corresponding to a basic torque Tb is Pb, supply flow rate Qs is $$Qs = a\sqrt{Pb} \cdot \sqrt{T_0/Tb} \times \sqrt{1 - f(i)}$$
$$= Qsb \sqrt{T_0/Tb}$$

where Qsb is $$Qsb = a\sqrt{Pb} \cdot \sqrt{1 - f(i)}$$

In the same manner, drain flow rate Qd is $$Qd = b\sqrt{Pb} \cdot \sqrt{f(i)} \times \sqrt{T_0/Tb}$$
$$= Qdb \sqrt{T_0/Tb}$$

wherein Qdb is $$Qdb = b\sqrt{Pb} \cdot \sqrt{1 - f(i)}$$

Average flow rate Q represented by the duty ratio D during one cycle of pulsis forming the duty ratio is If (where T is a correcting coefficient, namely a torque ratio factor), the equation is rewritten as follows.

$$\begin{aligned} D &= (Q + Qd)/(Qs + Qd) \\ &= (Q + Qdb \cdot T)/\{(T(Qsb + Qdb)\} \\ &= \{(Q + Qdb)/(Qsb + Qdb) + \\ &\quad (T - 1)Qdb/(Qsb + Qdb)\}/T \end{aligned}$$

The duty ratio D is rewritten by duty ratio Db at the basic torque Tb as follows. Since $Db = (Q + Qdb)/(Qsb + Qdb)$, the duty ratio D is $$D = (Db/T) + (1 - 1/T) \times \{Qdb/(Qsb + Qdb)\}$$

The duty ratio D determined by the above equation cam be corrected by changing values of Db, T and Qdb/Qsb+Qdb) term (Qdb/Qsb+Qdb) is determined by the construction of valves and the transmission ratio. A flow rate characteristic Qc which is defined as the above-mentioned term (wherein Qc+Qdb/(Qsb+Qdb)) can be previously set as Qc = F(i).

Further, above-mentioned equation can be rewritten as follows $$D = (Q + QdbT)/\{(Qsb + Qdb)T\}$$

As described above, $$Db = (Q + Qdb)/(Qsb + Qdb).$$

Further, Qdb/(Qsb+Qdb), namely Qcm can be transformed into a duty ratio DN when the transmission ratio changing speed di/dt is zero, that is the average flow rate Q is zero. Thus, the above equation is rewritten as follow $$D = (Db - DN) \cdot 1/T + DN$$

Figure 4:
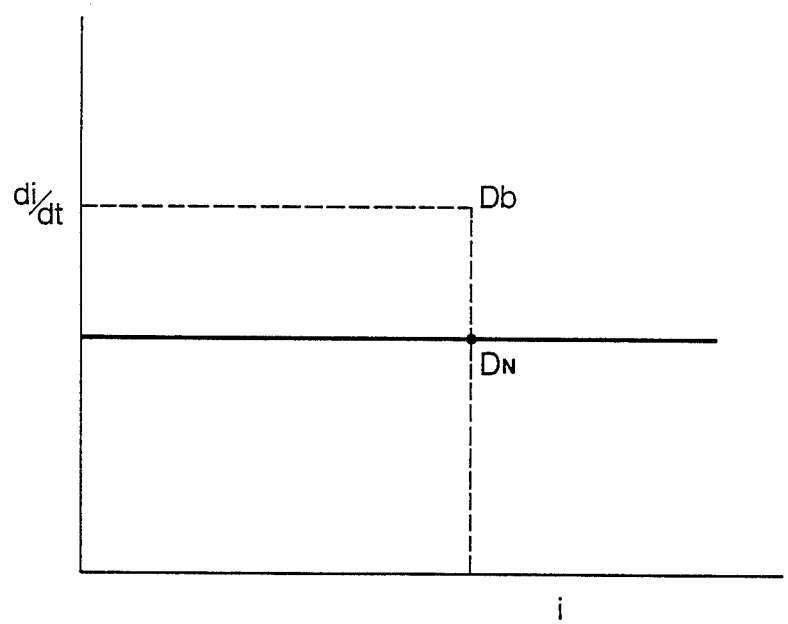
FIG. 4 showing a duty ratio.

FIG. 4 shows a duty table of the duty ratio Db dependent on changing speed (rate) di/dt and transmission ratio i. on the transmission ratio changing rate di/dt and the transmission ratio i. A solid line shows a duty ratio DN when the transmission ratio changing rate is zero (di/dt=). As shown for example by a dashed line, the duty ratio Db is obtained by the duty ratio table 79, FIGS. 3, 4 from the transmission ratio changing rate di/dt (calculated by the transmission ratio changing speed calculator 78) and the actual transmission ratio i (see FIG. 3). That is FIG. 4 represents a three-dimensional table, and the unknown value Db is derived from the known value of the transmission ratio changing rate di/dt (shown on the vertical axis) and the known value of the transmission ratio i (shown on the horizontal axis). The duty ratio D can be obtained by the duty ratios Db and DN, and the torque ratio factor T by using the above equation.

In accordance with the above described principle duty ratio correcting section 84 is provided at the output Db of the duty ratio table 79. A flow rate characteristic providing section 85 is applied with the actual transmission ratio i of the actual transmission ratio calculator 75 to provide the a flow rate characteristic Qc. A torque ratio calculator 86 is applied with the engine torque $T_0$ of the engine torque calculator 96 to calculate torque ratio factor (correcting coefficient) T. The flow rate characteristic Qc, the duty ratio Db and the torque ratio factor (correcting coefficient T are applied to the duty ratio correcting section 84.

In operation, while the vehicle is at a stop, chamber 10 of the driven pulley 8 is supplied with line pressure through passage 22b and the chamber 9 of the drive pulley 7 is drained, since the $N_P$, $N_S$, $\theta$ are zero and duty ratio D is zero, and the spool 52 is at the right end position and the drain port 51c communicates with the chamber 9 through the conduit 23 as shown in FIGS. 2a and 2b. Thus, in the pulley and belt device of the continuously variable belt-drive transmission, the driving belt 11 engages with the driven pulley 8 at a maximum running diameter to provide the largest transmission ratio (low speed stage). When the accelerator pedal is depressed, the clutch current increases progressively with increase of engine speed. The electromagnetic clutch 2 is gradually engaged, transmitting the engine power to the drive pulley 7. The power of the engine is transmitted to the output shaft 6 at the largest transmission ratio by the driving belt 11 and driven pulley 8, and further transmitted to axles of the driving wheels 19. Thus, the vehicle is started. When the vehicle speed (output signal $N_s$) exceeds a predetermined value, the clutch 2 is entirely engaged.

At the start of the vehicle, the line pressure is at the highest value by the pressure control valve 40, since the duty ratio for the valve 66 is large, and the spool 42 of the control valve 40 is at the right end position. When the throttle valve is opened for acceleration of the vehicle, the desired transmission ratio changing speed did/dt and transmission ratio changing speed di/dt are calculated at calculators 80 and 78. The transmission ratio changing speed (rate) di/dt is fed to the duty ratio table 79, so that duty ratio Db for valve 68 is obtained from the table 79. The duty ratio Db is corrected by the correcting section 84. The value of the duty ratio Db is larger than the neutral value, so that the pressure in the chamber 51d of the control valve 50 becomes higher than the chamber 51e. Thus, the spool 52 is shifted to the left to communicate the port 51a with port 51b so that oil is supplied to the chamber 9 through the conduit 23 to upshift the transmission. When the actual transmission ratio i reaches the desired transmission ratio id, the changing speed rate di/dt becomes zero, so that the upshifting operation stops.

As the difference between the desired ratio id and actual ratio i becomes large and the desired transmission ratio changing speed (rate) becomes large, the duty ratio for the valve 68 becomes large, thereby increasing the shifting speed of the spool 52 to increase the actual transmission changing speed. When the duty ratio is smaller than the neutral value, the spool 52 is shifted to the right to drain the chamber 9. Thus, the transmission is downshifted. The transmission ratio changing speed (rate) at downshifting increases with reducing of the duty ratio.

The control operation of line pressure will be described hereinafter. From the engine torque calculator 96, the torque $T_0$ is obtained in accordance with throttle position $\theta$ and engine speed $N_3$, which is applied to desired line pressure calculator 104. The calculator calculates the desired line pressure $P_L$. The solenoid operated on-off valve 66 is operated at a duty ratio corresponding to the desired line pressure $P_L$. The line pressure is applied to chamber 10 to hold the belt 11 at a necessary minimum force, the transmitting torque at which is slightly larger than torque $T_0$. Thus, power is transmitted through the transmission without slipping of the belt.

The actual transmission ratio i increases in accordance mainly with the difference K1 (id-i) to the desired transmission ratio id. As the actual transmission ratio i approaches the desired ratio id, the transmission ratio changing rate di/dt is corrected by the rate of change of the desired transmission ratio (di/dt) to advance a phase of the control operation so as to eliminate a control delay.

The duty ratio Db is corrected at correcting section 84 in accordance with the torque ratio T which is proportional to the line pressure and with the flow rate characteristic Qc. Thus, the transmission ratio is controlled in accordance with the variation of the lie pressure. Accordingly, an actual transmission ratio can be controlled to a desired transmission ratio.

Figure 5:
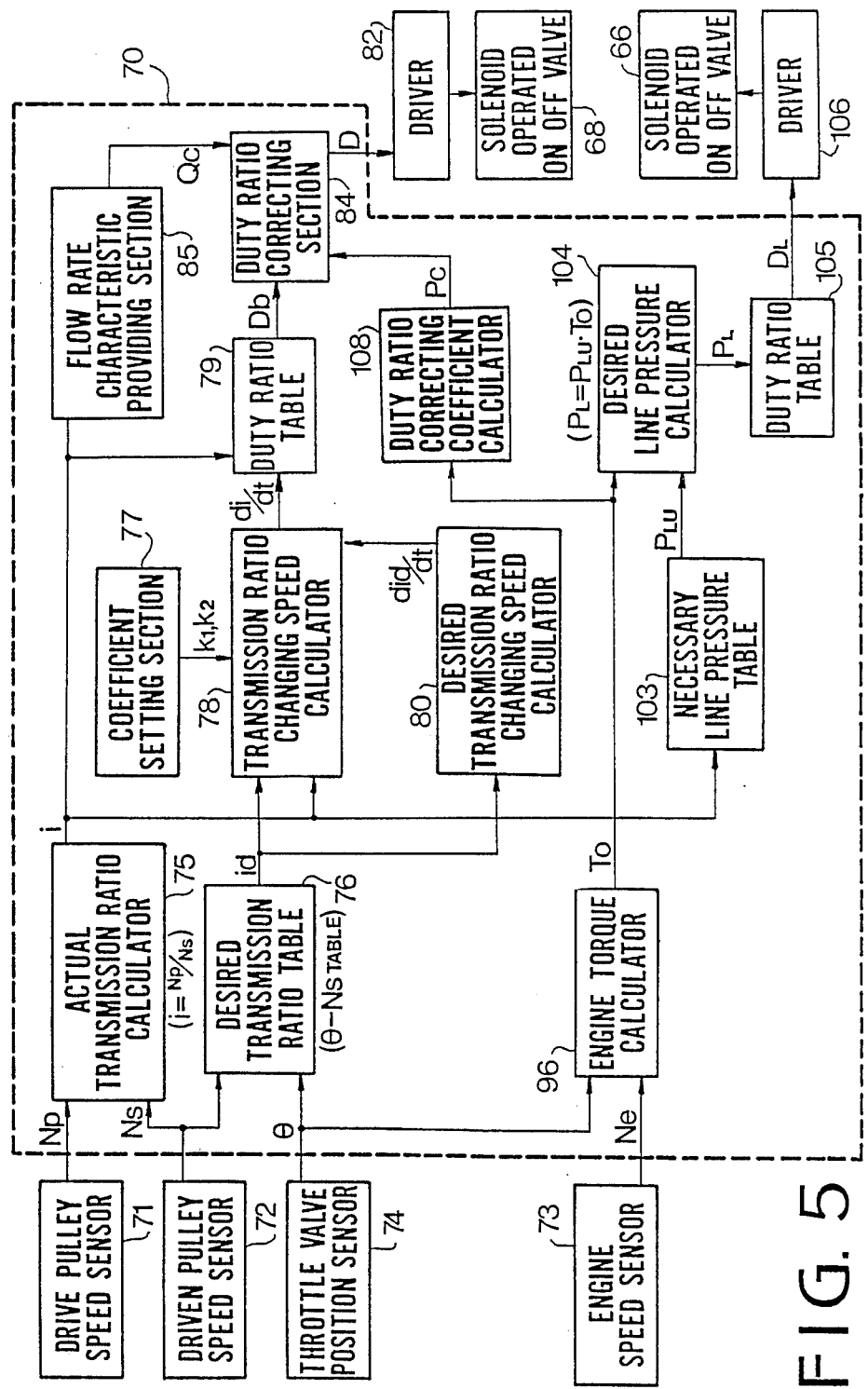
FIG. 5 is a diagram showing another embodiment of the invention.

FIG. 5 shows another embodiment of the present invention. The system is provided with a duty ratio correcting coefficient calculator 108. The calculator 108 is supplied with the desired line pressure $P_L$ and produces a correcting coefficient Pc dependent on the pressure $P_L$. The coefficient Pc is applied to the duty ratio correcting section 84. Thus, in the system, the transmission ratio is directly controlled in accordance with the line pressure.

While the presently preferred embodiment of the present invention has been shown and described, it is to be understood that this disclosure is for the purpose of illustration and that various changes and modifications may be made without departing from the spirit and scope of the invention as set forth in the appended claims.

What is claimed is:

1. In a control system for a continuously variable transmission for transmitting the power of an internal combustion engine, the transmission having a drive pulley including a hydraulically shiftable first disc and a hydraulic cylinder for operating the first disc, a driven pulley including a hydraulically shiftable second disc and a hydraulic cylinder for operating the second disc, and a belt engaged with both pulleys, the control system having a first hydraulic circuit having a line pressure control valve with a spool and ports to control a line pressure, a transmission ratio control valve with a spool and ports to control a transmission ratio of the transmission and a pump supplying oil to the hydraulic cylinder of the drive pulley through the transmission ratio control and line pressure control valves and to the hydraulic cylinder of the driven pulley controlled by the line pressure control valve, the improvement in the control system which comprises:

sensing means for sensing operating conditions of the engine and the transmission and for producing sensing signals dependent on the conditions;

shift means responsive to the sensing signals for shifting the spools of each control valve;

actual transmission ratio calculating means responsive to the sensing signals for calculating an actual transmission ratio and for producing an actual transmission ratio signal;

desired transmission ratio calculating means responsive to the sensing signals for calculating a desired transmission ratio and for producing a desired transmission ratio signal;

transmission ratio changing rate calculating means responsive to the actual transmission ratio signal and the desired transmission ratio signal for calculating a transmission ratio changing rate to operate the shift means and for producing a transmission ratio changing rate signal;

engine torque calculating means responsive to the sensing signals for calculating an engine torque and for producing an engine torque signal;

torque ratio calculating means responsive to the engine torque signal for calculating a torque ratio factor;

flow rate characteristic providing means responsive to the actual transmission ratio signal for producing a flow rate characteristic signal; and correcting means responsive to an output signal of the torque ratio calculating means and to the flow rate characteristic signal for correcting the transmission ratio changing rate signal so that the actual transmission ratio substantially coincides with the desired transmission ratio, so as to prevent hunting or overshooting of the operating conditions of the engine and transmission.

2. In a control system for a continuously variable transmission for transmitting the power of an internal combustion engine, the transmission having a drive pulley including a hydraulically shiftable first disc and a hydraulic cylinder for operating the first disc, a driven pulley including a hydraulically shiftable second disc and a hydraulic cylinder for operating the second disc, and a belt engaged with both pulleys, the control system having a first hydraulic circuit having a line pressure control valve with a spool and ports to control a line pressure, a transmission ratio control valve with a spool and ports to control a transmission ratio of the transmission and a pump supplying oil to the hydraulic cylinder of the drive pulley through the transmission ratio control and line pressure control valves and to the hydraulic cylinder of the driven pulley controlled by the line pressure control valve, the improvement in the control system which comprises:

sensing means for sensing operating conditions of the engine and the transmission and for producing sensing signals dependent on the condition;

shift means responsive to the sensing signals for shifting the spools of each control valve;

actual transmission ratio calculating means responsive to the sensing signals for calculating an actual transmission ratio and for producing an actual transmission ratio signal;

desired transmission ratio calculating means responsive to the sensing signals for calculating a desired transmission ratio and for producing a desired transmission ratio signal;

transmission ratio changing rate calculating means response to the actual transmission ratio signal and the desired transmission ratio signal for calculating a transmission ratio changing rate to operate the shift means and for producing a transmission ratio changing rate signal;

engine torque calculating means responsive to the sensing signals for calculating an engine torque and for producing an engine torque signal;

desired line pressure calculating means responsive to the engine torque signal for calculating a desired line pressure and for producing a desired line pressure signal;

correcting coefficient calculating means responsive to the desired line pressure signal for calculating a correcting coefficient signal;

flow rate characteristic signal providing means responsive to the actual transmission ratio signal for producing a flow rate characteristic signal; and correcting means responsive to the correcting coefficient signal and the flow rate characteristic signal for correcting the transmission ratio changing rate signal so that the actual transmission ratio substantially coincides with the desired transmission ratio, so as to prevent hunting or overshooting of the operating conditions of the engine and transmission.

3. In a control system for a continuously variable transmission for transmitting the power of an internal combustion engine, the transmission having a drive pulley including a hydraulically shiftable first disc and a hydraulic cylinder for operating the first disc, a driven pulley including a hydraulically shiftable second disc and a hydraulic cylinder for operating the second disc, and a belt engaged with both pulleys, the control system having a first hydraulic circuit having a line pressure control valve with a spool and ports to control a line pressure, a transmission ratio control valve with a spool and ports to control a transmission ratio of the transmission and a pump supplying oil to the hydraulic cylinder of the drive pulley through the transmission ratio control and line pressure control valves and to the hydraulic cylinder of the driven pulley controlled by the line pressure control valve, the improvement in the control system which comprises:

sensing means for sensing operating conditions of the engine and the transmission and for producing sensing signals dependent on the conditions;

shift means responsive to the sensing signals for shifting the spools of each control valve;

actual transmission ratio calculating means responsive to the sensing signals for calculating an actual transmission ratio;

desired transmission ratio calculating means responsive to the sensing signals for calculating a desired transmission ratio;

transmission ratio changing rate calculating means responsive to the actual transmission ratio and the desired transmission ratio for calculating a transmission ratio changing rate to operate the shift means;

engine torque calculating means responsive to the sensing signals for calculating engine torque;

calculating means for calculating a correcting coefficient as a function of engine torque;

flow rate characteristic providing means responsive to the actual transmission ratio for producing a flow rate characteristic; and correcting means responsive to the correcting coefficient of the calculating means and to the flow rate characteristic for correcting the transmission ratio changing rate so that the actual transmission ratio substantially coincides with the desired transmission ratio, so as to prevent hunting or overshooting of the operating conditions of the engine and transmission.

4. A control system according to claim 3, wherein said flow rate characteristic providing means provides said flow rate characteristic further as a function of the spool and ports of the transmission ratio control value.

5. The control system according to claim 3 wherein the transmission ratio control valve has chambers at both ends of the spool, the shift means includes a second hydraulic circuit for supplying oil to the chambers, and control valve means provided with the second hydraulic circuit for controlling flow rate of control oil supplied to at least one of the chambers of the transmission ratio control valve.

6. The control system according to claim 5 where in the control valve means is a solenoid operated on-off valve, and the control signal of the control unit is pulses, the duty ratio of which is changed so as to control the transmission ratio changing speed (rate).

7. The control system according to claim 5, wherein the second hydraulic circuit is provided with a regulator valve for maintaining the pressure of oil at a constant value.

8. The control system according to claim 3 wherein the sensing means comprises a drive pulley speed sensor, driven pulley speed sensor and throttle valve position sensor.

* * * * *